Feb. 10, 1970    H. SCHILL    3,494,144
ROTARY DRUM FLAKE ICE MAKER
Filed Jan. 16, 1969    4 Sheets-Sheet 1
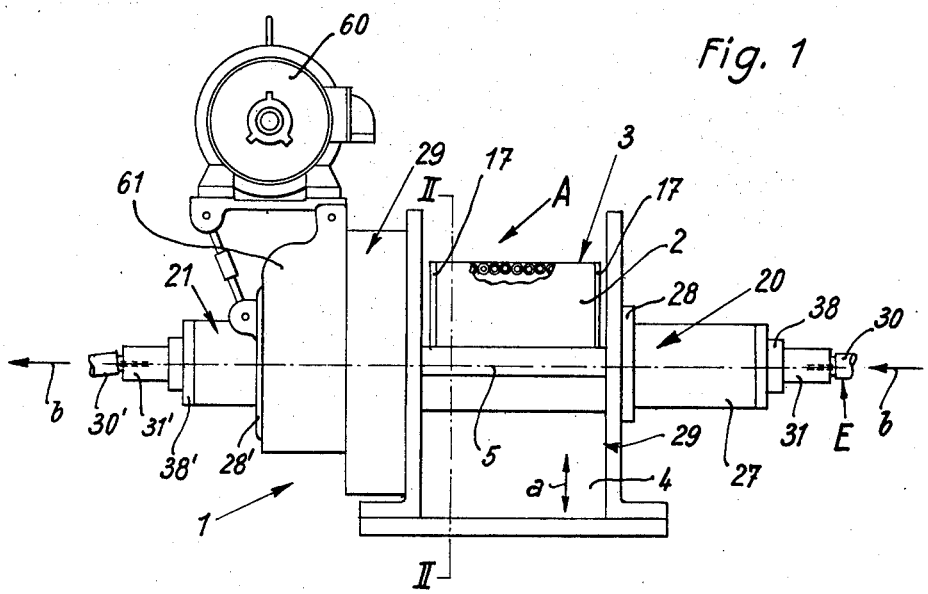
Fig. 1
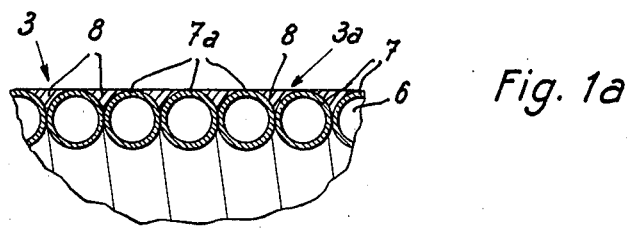
Fig. 1a
Fig. 1b
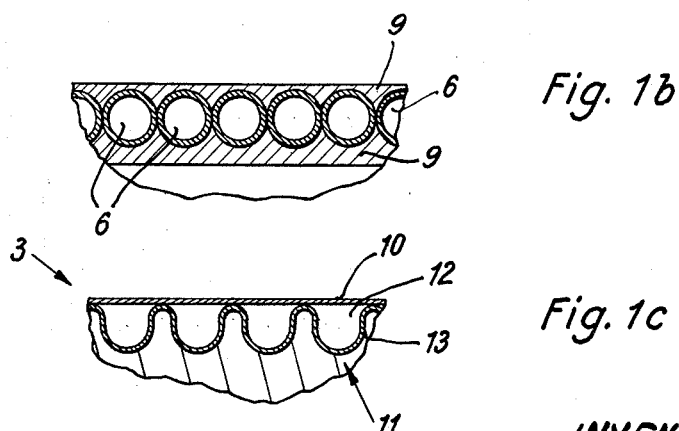
Fig. 1c
INVENTOR:
HERMANN SCHILL
by Jacob L. Kollin,
ATTORNEY

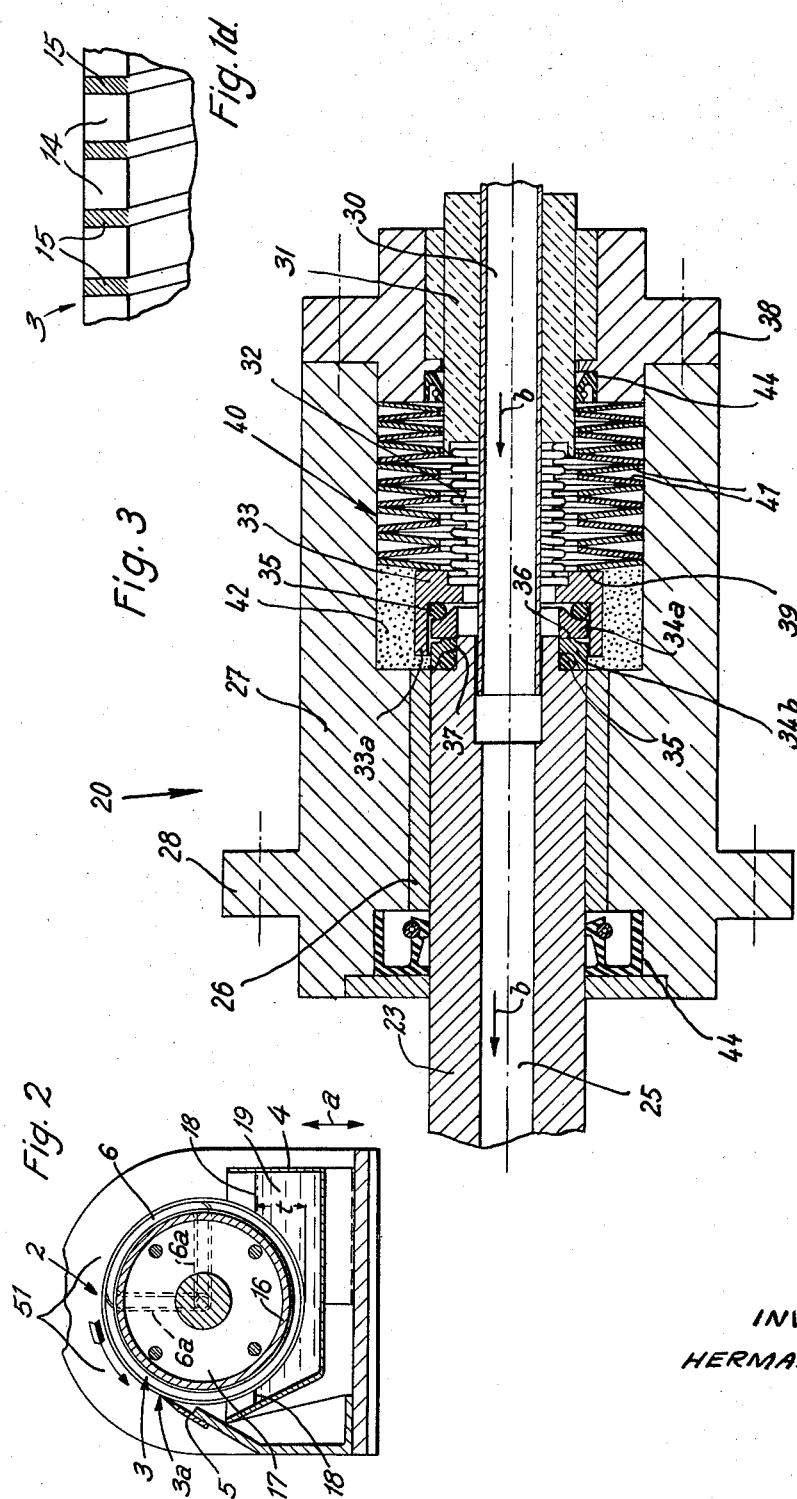

Feb. 10, 1970    H. SCHILL    3,494,144
ROTARY DRUM FLAKE ICE MAKER
Filed Jan. 16, 1969    4 Sheets-Sheet 3

INVENTOR:
HERMANN SCHILL
by Jacob L. Kolliv
ATTORNEY

Feb. 10, 1970  H. SCHILL  3,494,144

ROTARY DRUM FLAKE ICE MAKER

Filed Jan. 16, 1969  4 Sheets-Sheet 4

INVENTOR
HERMANN SCHILL
by Jacob L. Kelley
ATTORNEY

United States Patent Office 3,494,144
Patented Feb. 10, 1970

3,494,144
ROTARY DRUM FLAKE ICE MAKER
Hermann Schill, Schulstrasse 212, Goldscheuer,
Baden, Germany
Continuation-in-part of application Ser. No. 605,015,
Dec. 27, 1966. This application Jan. 16, 1969, Ser.
No. 814,866
Int. Cl. F25c 7/12
U.S. Cl. 62—346                                17 Claims

ABSTRACT OF THE DISCLOSURE

A device for making fine ice or the like frozen products comprising a rotatable drum, the cylindrical jacket of which is formed of tube-like conduits for a refrigerating agent. A trough for the liquid to be frozen is arranged under the drum, the latter extending partly into the trough. Means for supplying refrigerant to the tube-like conduits are provided. A scraper for removing an ice layer forming on said drum is arranged adjacent the drum.

BACKGROUND OF THE INVENTION

The present application is a continuation-in-part of U.S. application for Patent S.N. 605,015 filed on Dec. 27, 1966, now abandoned by the same applicant.

This invention relates to a method of producing fine ice or the like frozen products, in which the ice is produced on the outer jacket surface of an internally cooled rotatable drum immersed in a trough containing a freezing liquid, and in which the ice layer thus formed on the drum jacket is removed by means of a scraper or the like. The invention relates also to a device for producing fine ice or the like frozen products, particularly for carrying out the aforementioned method.

An object of the invention is to provide a method of producing fine ice or the like frozen products that are sufficiently frozen, i.e. not watery, but easy to remove from the drum. In this context, the term fine ice is to denote ice of fine structure, such as broken ice, granulated ice, ice flakes, snow and the like. Such artificial fine ice is used, for example, for cutter purposes in the manufacture of sausage or for the storage of fish and the like. At the same time, form size and structure of the ice pieces should easily be controllable in a wide range. Moreover, fine ice should not only be produceable on the basis of water. Consequently, it is also intended to enable the manufacture of other frozen products, such as milk, fruit juice concentrates and the like.

Another object of the invention is to provide a device for producing fine ice or the like frozen products which is provided with a comparatively sturdy drum having, at the same time, relatively thin heat transfer walls and comparatively large heat transfer cross sections so as to enable a rapid and intense heat absorption, while ensuring the necessary mechanical strength of the drum, which is required for loosening and removing the ice therefrom.

More specifically, the present invention provides a method of producing fine ice or the like frozen products, comprising the steps of producing the ice on the outer jacket surface of an internally cooled rotatable drum immersed in a trough containing a freezing liquid, generating considerable residual stresses in the ice layer formed on the drum, which is achieved, for example, by rapid and intense heat absorption, different temperature distribution in the ice layer, and the like, and removing the ice layer formed on the drum jacket by means of a scraper or the like.

These residual stresses may be caused, for example, by a short-term intense local heat absorption at the ice layer so that a different temperature distribution within the ice layer is achieved whereby cracks are formed in the ice layer or the formation of such cracks is at least promoted.

It is also expedient to impart different temperatures to the ice layer in the direction of the drum axis, thereby to produce in this direction, too, different stresses due to thermal expansion which stresses help to produce the desired residual stresses or cracks as well as a certain brittleness of the ice layer on the drum.

For carrying out this method, the invention provides a device for producing fine ice or the like frozen products, comprising a substantially horizontally arranged rotatable drum or the like which is adapted to be inwardly cooled and immersed in a trough containing a freezing liquid, tube-like conduits for a refrigerating agent substantially forming the drum jacket or the like outer surface and arranged side by side, preferably in helical windings, and a scraper disposed adjacent the drum jacket or the like for removing the ice layer forming on the drum.

The drum jacket may preferably consist of a tube conduit for the refrigerating agent, which tube conduit is arranged in parallel helical windings. The tubes forming the conduit for the refrigerating agent may be of circular, rectangular, triangular or square cross section. A form of construction in which the conduit for the refrigerating agent is formed of circular cross section tubes arranged in closely adjacent helical windings and having external wall portions interconnected by a material of good thermal conductivity which together with sections of the tube walls forms the outer surface of the drum jacket, has proved particularly advantageous. The outer surface of the drum jacket may be finished on a lathe and, if desired, polished so as to obtain a very smooth drum jacket surface by the described measures. Even if using very thin-walled tubes for forming the drum jacket, thus providing the precondition for a good heat transfer, there will still result a very sturdy drum construction, since the walls of the tubes or the like will give the whole drum wall a cross section having advantageous strength characteristics. Similar results can be achieved by using a thin-walled cylinder for the drum jacket, in which cylinder an insert is fitted which has radially outwardly open channels closed by the drum jacket. Such an insert can be manufactured in a particularly simple manner if these channels are provided by threads, e.g. of a knuckle thread.

Several embodiments of the invention will now be described by way of example and with reference to the accompanying drawings, in which:

FIG. 1 is a front elevational view, partly in section, of an ice producing device according to the invention;

FIG. 1a is an enlarged view of the drum jacket section indicated by arrow A of FIG. 1;

FIGS. 1b to 1d are views similar to FIG. 1a of further modifications of the drum jacket;

FIG. 2 is a section taken on line II—II of FIG. 1;

FIG. 3 is a longitudinal section, on an enlarged scale, through a bearing of the drum of the device shown in FIG. 1;

Figure 5:
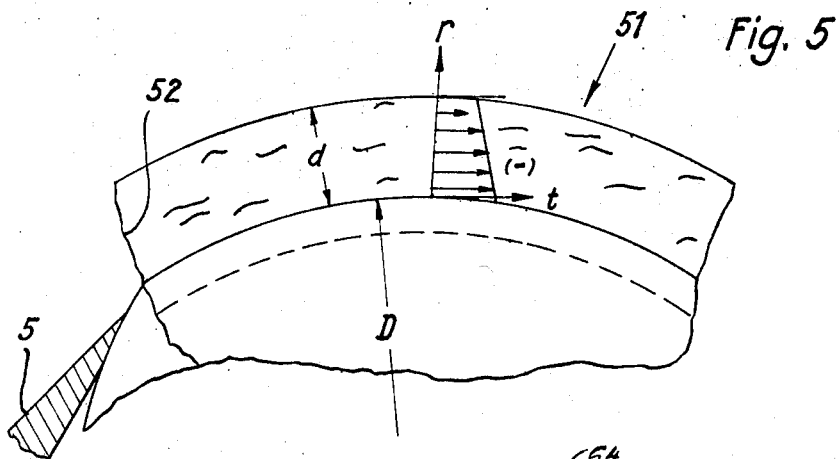
FIG. 5 is a partial cross section, on an enlarged scale, through the ice layer.

Referring to the drawings and particularly to FIG. 1, an ice producing device 1—in this specification also briefly referred to as "the device 1"—comprises a horizontally arranged rotable drum 2 provided with a plain cylindrical jacket 3 and immersed in a trough 4 containing a freezing liquid. Contacting the drum jacket 3 is the upper end of a blunt knife-like scraper 5. As shown particularly in FIGS. 1, 1a and 4, the drum jacket 3 of the device 1 is formed substantially of a circular cross section refrigerating agent conducting tube 6 arranged in closely adjacent helical windings thereby forming a closed drum jacket 3. In this embodiment; the gaps between the tube walls 7 on the outside of the jacket 3 so formed are filled with a material of good thermal conductivity, such as silver solder 8, in order to obtain a smooth outer surface of the drum 2. The silver solder 8 also interconnects the individual tube windings, thereby to increase the strength of the entire drum 2 and the cross section of heat transfer (see FIG. 1 and, in particular, FIG. 1a).

In FIGS. 1b to 1d sections of slightly modified forms of the drum jacket 3 are illustrated. FIG. 1b shows an embodiment in which the windings of the tube 6 forming the jacket 3 are completely embedded, both on the inside and outside of the drum 2, in a layer 9 consisting, for example, of copper. This arrangement permits to improve the strength of the drum but, as a rule, will somewhat impair the heat transfer compared with the FIG. 1a embodiment in which the outer surface 3a of the jacket 3 is also formed by short sections 7a of the tube walls 7.

In the embodiment shown in FIG. 1c, the drum has a very thin jacket 3 consisting, for example, of a thin-walled copper or silver cylinder 10. Within this drum an insert 11 is arranged and applied to the inner surface of the cylinder 10, which insert provides helically extending channels 12 outwardly closed by the cylinder 10. In the illustrated embodiment, the insert 11 consists of appropriately formed thin sheet metal. However, it is also possible to use a tube-like insert in which the channels 12 are provided, for example, by a knuckle thread produced from outside by cutting or bulging.

FIG. 1d shows a section of a drum jacket 3 formed of tubes 14 having rectangular cross sections. The tubes 14 are interconnected with their radial surfaces 15, e.g. by soldering.

FIG. 2 shows a slight modification over the FIGS. 1 and 1a embodiment in which the tube 6 is wound outwardly on an inner cylinder 16. If this inner cylinder 16 is made of heat insulating material, it is possible to reduce the radiation of cold towards the interior of the cylinder 16, which may possibly be of advantage to the heat or cold insulation at the end faces 17 of the drum 2. Moreover, the inner cylinder 16 improves the strength of the drum 2. The endwalls 17 of the drum 2 are made of heat insulating material.

In FIG. 2, double arrow a indicates that the trough 4 is vertically adjustable relative to the drum 2. The same effect may be achieved by controlling the level 18 of the freezing liquid 19, for example, by means of a discharge opening (not shown) which is adjustable in height.

Figure 4:
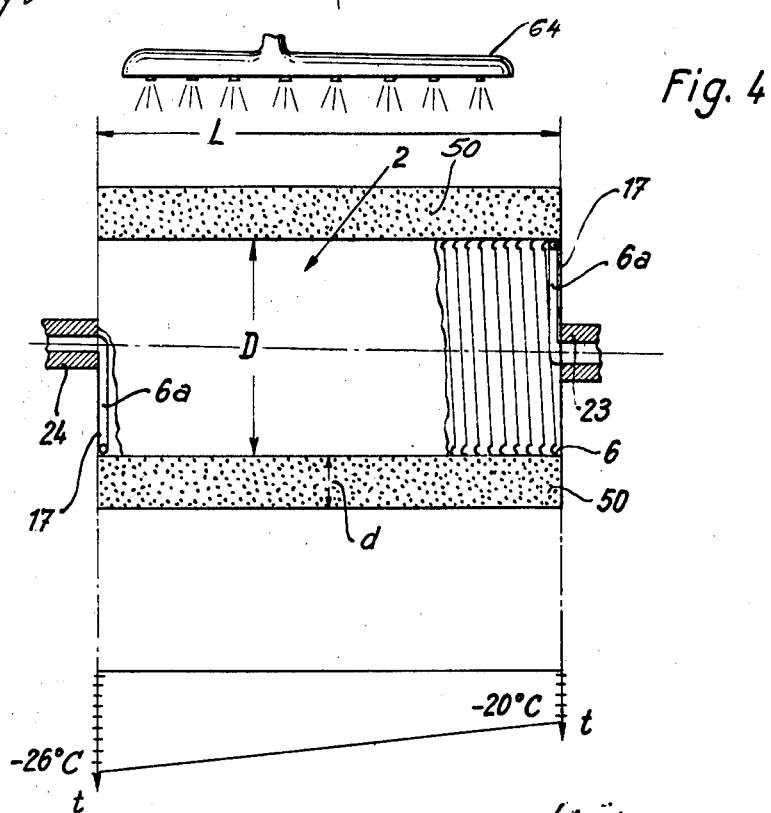
FIG. 4 is a schematic front elevational view, partly in section, of the drum with the ice layer thereon in enlarged representation.

The device 1 is provided with bearings 20 and 21 (FIG. 1), one of which is shown in detail and on an enlarged scale in FIG. 3. The bearings rotatably support drum supporting shafts 23 and 24 axially secured to the end walls 17 of the drum 2, as shown in FIG. 4. Turning again to FIG. 3, the shaft 23 is provided, more specifically, with a central bore 25 and rotatably supported in a bearing bush 26 fixed in the housing 27 of the bearing 20. The housing 27 is provided with a flange 28 for securing the bearing 20 to the frame 29 of the device 1. The outer end of the bore 25 of the shaft 23 receives one end of a refrigerating agent conduit 30. The sealing between the latter and the drum supporting shaft 23 is achieved in that the conduit 30 is sealingly connected with a mounting sleeve 31 which is followed by axially flexible concertina walls 32 which at their end adjacent the drum 2 are connected with a pot-shaped retaining element 33 having a counterbored portion 33a. As sealing means, two discs 34a and 34b are provided. The disc 34a is sealingly arranged within the counterbore in the portion 33a of the pot-shaped retaining element 33 by means of a sealing ring 35, and the disc 34b is sealingly seated, likewise by means of a sealing ring 35, on the outer end of the rotatable shaft 23. The contacting end faces 36 and 37 of the discs 34a and 34b which are known per se are completely smooth and superfinished. The counterbored portion 33a of the retaining element 33 also slightly engages over the disc 34b arranged on the shaft 23, whereby a certain guide is provided for the pot-shaped retaining element 33 and, moreover, the sealing is improved. The superfinished end faces 36 and 37 of the discs 34a and 34b are urged into contact with each other by a spring generally indicated at 40 which is arranged between a cover 38 of the bearing 20 and the outwardly directed end face 39 of the pot-shaped retaining element 33 in a bore 42 of the housing 27. In the illustrated embodiment, the spring 40 consists of a plurality of individual spring plates 41. The concertina walls 32 which are made of thin metal provide for the necessary play, particularly in axial direction. In this manner, the refrigerating agent conduit 30 is reliably sealed up to the disc 34a and, at the same time, the compensation of thermal expansion and untrue running is rendered possible. The bore 42 accommodating the spring 40 in the housing 27 extends up to the bearing bush 26 and forms an annulus-shaped oil chamber in the region of the pot-shaped retaining element 33 and the discs 34, the oil contained in this chamber being expedient to both the lubrication of the bearings and sliding surfaces, respectively, and the sealing. Furthermore, conventional sealing rings 44 are also provided on the stationary mounting sleeve 31 and on the drum supporting shaft 23. The foregoing description of the bearing 20 applies similarly to the bearing 21 which, as shown in FIG. 1, comprises a flange 28' and a cover 38' receiving a mounting sleeve 31' with a refrigerating agent conduit 30'.

The ice producing device proposed by the invention operated as follows:

The refrigerating agent is supplied to the jacket 3 of the drum 2 through the conduit 30, as indicated by arrows b at the right-hand end of FIG. 1 and in FIG. 3, and through the central bore 25 in the shaft 23. The refrigerating agent will leave the device 1 at the other end thereof (the left-hand end in FIGS. 1 and 4) through the conduit 30'. The drum 2 is immersed almost to the hub in the freezing liquid 19, such as water, contained in the trough 4. As a rule, the freezing liquid 19 forms already within the trough 4 and ice layer 50 having a radial thickness d (FIGS. 4 and 5) in order of about 1 to several millimetres, which is controllable within certain limits. Experiments have shown that the ice layer 50 when it is still in the trough 4 or immediately above thereof is very solid in itself so that it is difficult or even impossible to remove it from the drum 2 by scraper-like tools. When the ice layer 50, upon further rotation of the drum 2, gets to the upper region 51 (FIG. 2) of the drum 2, numerous cracks surprisingly appear in the ice layer 50. Sometimes this occurs all of a sudden, that is, when the leading edge 52 of the ice layer 50 strikes against the blunt knife-like scraper 5 and thus is subjected to an additional compression and deflecting load. Frequently, however, these cracks also appear in the upper region 51 without the agency of the scraper 5. In this manner, the ice layer 50 can particularly easily be removed from the drum 2 by the scraper 5 wiping the surface 3a of the drum jacket 3.

The fact that the drum jacket consists of tubes or the like conduits for the refrigerating agent, which have relatively thin walls, enables an intense and rapid heat absorption on the ice layer 50 with the drum 2 being of sufficient strength. The ice layer 50 moving out of the trough 4 is further supercooled in the region 51 in such a manner that the ice layers closest to the drum 2 will assume, or at least earlier assume, lower temperatures than the outer zones of the ice layer 50. This temperature gradient within the ice layer 50 causes different expansions due to temperature and thus residual stresses in the ice layer 50 which may promote the formation of cracks. Especially in the region in which the coefficient of expansion of the ice is negative, a radial temperature distribution in the ice layer, in which the coldest zone is adjacent the jacket surface 3a, may contribute to cause the ice layer 50 to tend to detach itself from the drum 2.

Constructing the drum jacket proposed by the invention of closely adjacent helically wound tubes 6 or the like conduits for the refrigerating agent also results in a different temperature distribution within the ice layer in the axial direction of the drum. For example, in the ice removed from the refrigerating agent inlet end of the drum temperatures of 20 degrees centigrade below zero were measured, whereas the ice removed at the same time from the refrigerating outlet end of the drum showed temperatures of 26 degrees centigrade below zero. It is safe to assume that at the time at which the ice is still on the drum these temperature differences are even vaster and, in any case, contribute to cause different temperature expansions and residual stresses in the ice layer also in the axial direction of the drum 2, which also conduce to crack formation in the ice layer 50.

Experiments carried out with one embodiment of the device 1 have shown that the crack formation in the water ice layer 50 frequently occurs without any action of the scraper 5 on the ice layer. In this device, the drum 2 has a length L of 500 mm., an outer diameter D of 200 mm. (FIGS. 4 and 5), and its jacket 3 is constructed as shown in FIG. 1a, the tubes 6 having an inside diameter of about 18 to 20 mm. During the test run this device 1 was operated with an immersion depth t of the drum 2 of 70 mm. and the speed of rotation of the drum as well as the refrigerating agent supply were controlled according to the desired operation and ice structure.

In a slightly modified embodiment of the device 1, in which the diameter D and the length L of the drum are slightly smaller and in which the gaps between the adjacent outer walls of the tubes 6 are filled with brazing-solder instead of the silver solder 8, the crack formation, as a rule, occurred only when the ice layer 50 struck against the scraper 5, but even then the crack formation was very intense so that in this case, too, the removal of the ice from the drum was surprisingly effected without any difficulty.

In developing the invention it is possible, according to a further feature of the invention, to additionally apply by a spray device 62 or in a known manner water to the ice layer 50, if necessary as shown in FIG. 5.

Besides silver solder 8, brazing solder and copper also special tin solder having a particularly good heat conductability, surface hardness and sufficient chemical neutrality in respect of the frozen products to be produced may be used as a connecting material for the tubes.

Figure 7:
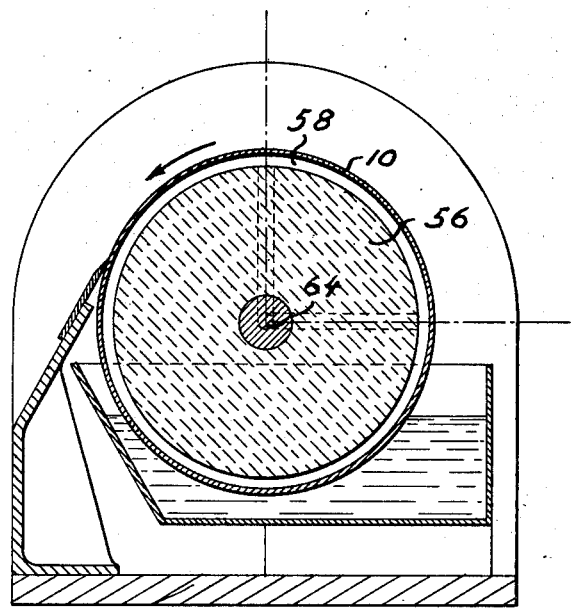
FIG. 7 is a cross-section thereof.
Figure 6:
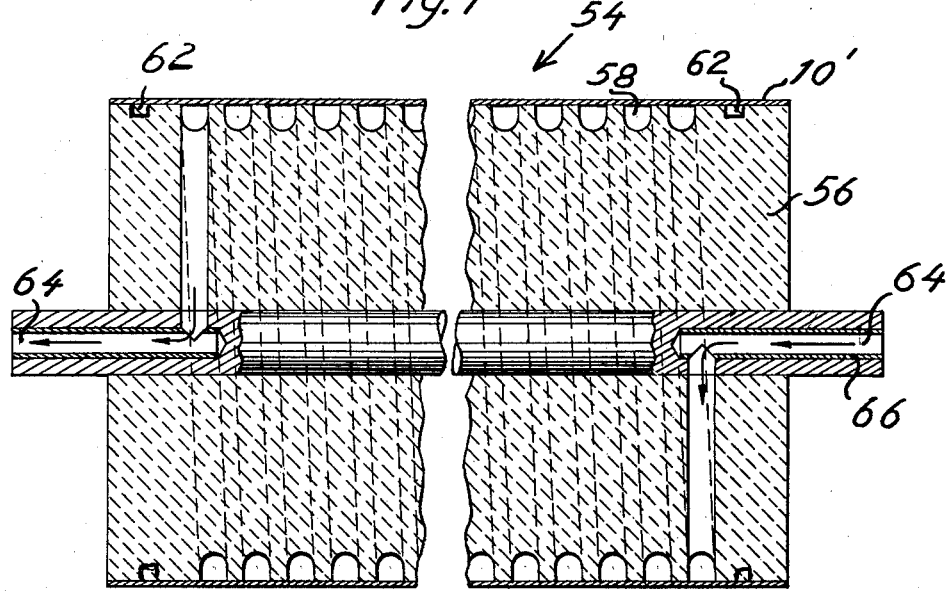
FIG. 6 is a longitudinal section through a drum employing a solid plastic cylinder.

In the embodiment shown in FIGS. 6, 7, the drum generally indicated by the numeral 54 consists of a solid plastic heat-insulating cylinder 56 and continuous helical grooves 58. A cylindrical heat-conductive jacket 10′ of copper or aluminum encloses the cylinder 56. This jacket is similar to jacket 10, shown in FIG. 1c. The jacket 10′ covers the grooves, so that a good thermal passage of the cooling medium in the grooves 58 to the outer jacket 10′ takes place.

Seals 62 may be further provided between the cylinder 56 and the jacket 10′ for better sealing.

The jacket on which cylinder 56 is mounted, and has supply and discharge bores 64 communicating with the grooves 58, may be further provided with an insulation 66.

For driving the drum 2 an electric motor 60 and a reduction gearing accommodated in a gear box 61 are provided.

The ice producing device proposed by the invention has the following advantages:

High efficiency and high specific output are achieved. In particular, a very rapid heat absorption on the freezing liquid or the ice layer 50, respectively, is ensured. The surprisingly occurring residual stresses in the ice layer 50 frequently and easily result in considerable crack formations in the ice layer 50 and thus make this latter brittle so that it can satisfactorily and completely be removed from the outer surface 3a of the drum jacket 3 by means of a knife-like scraper 5, whereupon the drum with a perfectly smooth surface immerses again into the trough 4 containing the freezing agent, whereby a reliable continuous operation is ensured.

The device 1 is simple in construction. This applies particularly to the scraper 5 for removing the ice from the drum 2.

The helical arrangement of the conduits 6, 12 or 17, respectively, for the refrigerating agent has the additional advantage that any oil which may undesirably have entered the cooling agent conduits is continuously and automatically conducted out of the region of the drum 2 by helical movements. A special oil separator can thus be dispensed with and the heat transfer is not additionally disturbed.

Worth mentioning is also the wide range of control of the device 1. The ice formation can be controlled by varying the immersion depth of the drum 2 as well as by varying the speed of rotation thereof. Further regulation is possible through the quantity of refrigerating agent supplied per unit time and through the temperature of the supplied refrigerating agent. The device 1 can thus satisfactorily be adapted to the type of fine ice desired in each case, which applies above all also to those cases in which frozen products other than water ice, e.g. frozen products of milk, fruit juice and the like, are to be produced.

Reference has to be made to the fact that the fine ice produced by the device proposed by the invention has a particularly high latent heat. For example, in water ice having a supercooled temperature ranging from 8 to 13 degrees centigrade below zero a heat absorption of 84.5 Kcal./kg. up to complete melting was experimentally determined. The theoretical value is 84 to 86.5 Kcal./kg. The congruence of measured and theoretical values means that the ice was dry, i.e. completely frozen through.

The formation of cracks in the ice layer 50 can perhaps best be compared with a water glass which when pouring water therein is locally differently abruptly heated or cooled and thus cracks due to temperature stresses.

The invention may be embodied in other specific forms without departing fram the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A device for making fine ice or the like frozen products comprising
    a supporting frame and a housing for the device,
    a horizontal shaft rotatably mounted in said frame,
    a cylinder made of a heat insulating material secured to said shaft for rotation therewith, tube-like conduits for a refrigerating agent forming an ice-freezing jacket for said cylinder, a trough for liquid to be frozen, mounted below said drum, said cylinder extending partly into said trough and a scraper disposed adjacent the cylinder for removing an ice layer forming on said cylinder and means to provide refrigeration to said conduits.

2. A device as claimed in claim 1, wherein the tube-like conduit is formed of a thin-walled cylinder and an insert fitted in said cylinder, said insert having helical radially outwardly open channels closed by said cylinder, said channels forming the conduit means for the refrigerating agent.

3. A device as claimed in claim 1, wherein the cylinder is provided with end walls made of heat insulating material.

4. A device as claimed in claim 1, wherein the trough containing the freezing liquid or its liquid level, respectively, is adjustable in height relative to the drum.

5. A device as claimed in claim 1, wherein hollow drum supporting shafts are secured to the end walls of the drum for supplying the refrigerating agent to, and discharging it from, the drum, said hollow shafts communicating with the connecting ends of the refrigerating agent conduit of the drum.

6. A device as claimed in claim 1, including a stationary refrigerating agent supply conduit, a refrigerating agent conduit rotatable together with the drum, said refrigerating agent conduit comprising a pair of cooperating discs sealingly contacting each other with their end faces, one of said discs being mounted on the rotatable drum supporting shaft, the other of said discs being sealingly connected to a mounting sleeve secured against rotation, the refrigerating agent supply conduit being sealingly connected to the mounting sleeve and means urging the discs against each other.

7. A device as claimed in claim 6, wherein the stationary disc is provided with a pot-shaped retaining element having a counterbored portion engaging with its outer rim over the rotatable disc.

8. A device as claimed in claim 7, further provided with a spring urging the discs into sealing contact, said housing being provided with a bore, the pot-shaped retaining element being mounted in said bore and an annulus-shaped oil chamber extending at least around said pair of discs and said pot-shaped retaining element engaging over the latter.

9. A device as claimed in claim 1, wherein the drum has a length of about 500 mm. and an outer diameter of about 200 mm. and the tube-like conduits have a cross-sectional area of about 310 sq. mm.

10. A device as claimed in claim 1, wherein the speed of rotation of the drum is variable at least in the range between 1 and 10 r.p.m.

11. A device as claimed in claim 1, wherein the scraper is arranged slightly above the liquid level on the side of the trough on which the jacket of the drum is immersed into the trough.

12. A device as claimed in claim 1, wherein means are provided for additionally spraying or wetting the ice layer with further freezing liquid.

13. A device as claimed in claim 1, wherein said cylinder is a solid cylinder made of a heat insulating material having a cylindrical wall provided with continuous helical grooves, a cylindrical jacket of heat-conductive material enclosing said cylindrical wall and said grooves, said cylindrical wall and said cylindrical jacket forming said tube-like conduits therebetween.

14. A device as claimed in claim 13, wherein said cylinder is made of a plastic material and said cylindrical jacket is of aluminum material.

15. A device as claimed in claim 13, wherein said cylindrical jacket is in sealing engagement with said cylindrical wall.

16. A device as claimed in claim 13, further provided with a pair of circular seals between said cylindrical wall and said cylindrical jacket adjacent the respective ends of said cylinder.

17. A device as claimed in claim 13, wherein the respective ends of said shaft are provided with bores for communicating with said tube-like conduits and an insulating material covering said bores.

References Cited

UNITED STATES PATENTS 2,344,922  3/1944  Raver _____ 62—346 X

WILLIAM E. WAYNER, Primary Examiner

U.S. Cl. X.R.

165—91